United States Patent Office 2,863,284
Patented Dec. 9, 1958

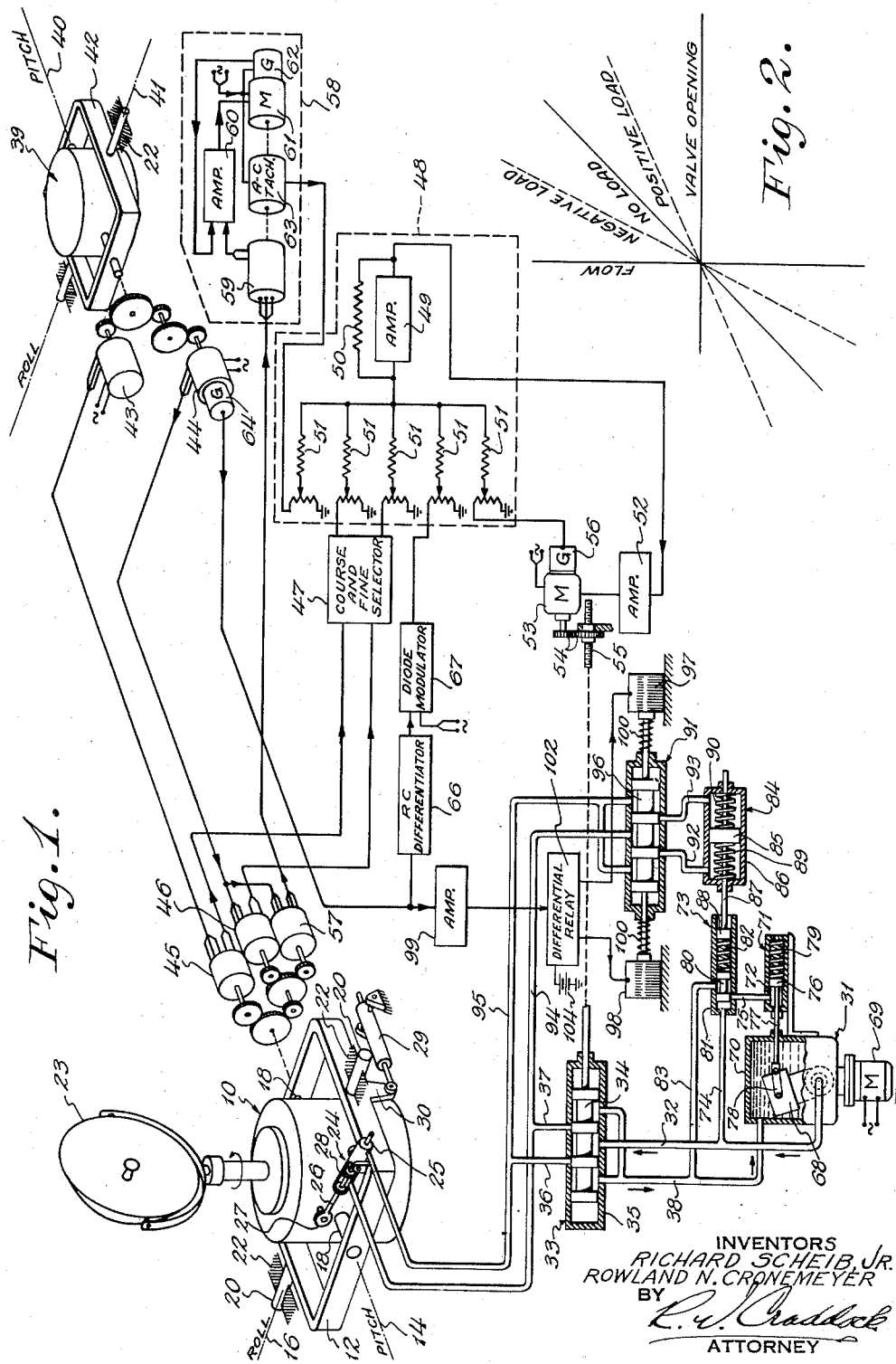

2,863,284

HYDRAULIC SERVO SYSTEM

Richard Scheib, Jr., New Hyde Park, and Rowland N. Cronemeyer, Seaford, N. Y., assignors to Sperry Rand Corporation, a corporation of Delaware Application November 21, 1952, Serial No. 322,464

16 Claims. (Cl. 60—52)

This invention relates to servo systems, and more particularly, is concerned with an hydraulic power control for a servomechanism.

In the usual servomechanism a comparison is made between an input and output depending upon the relative position of a controlling and a controlled member. A source of power is so controlled and applied as to move the controlled member and reduce the difference between the input and output to zero. When the movement of the controlling member is small, as the apparent tilting of a gyro-vertical relative to a rolling and pitching ship, and where large torques are required due to wind loading, as in the positioning of a radar antenna mounted high in the superstructure of the ship, the power control may advantageously utilize a simple ram-type hydraulic motor. This power ram is controlled by varying the flow of fluid to either side of the ram, as by means of a control valve connected between the ram and an hydraulic pump. The control valve is actuated by any suitable servo means responsive to the difference between the relative movement and position of the controlling and controlled members.

While such an hydraulic power control is relatively simple in operation and provides high torque output as desired, it is subject to the limitation that for a given valve opening, constant velocity of the ram can only be achieved under constant load conditions, any change in load affecting the pressure drop across the control valve, and hence, the rate of flow of hydraulic fluid through the control valve. Changing loads on the power ram thus develop errors in the servo system which can only be corrected by changing the valve opening.

A servomechanism built with an hydraulic power control of the type above described can be designed to give stable performance, be well damped, and yet be fast in its response when operating under loads which are substantially in one direction, as in frictional and inertial loads which oppose the movement of the controlled member. Where the principal loading may be both positive and negative, that is, may either oppose or aid movement of the controlled member, it has been found that the servomechanism becomes unstable under extremes of either type of loading condition and that no modification of the servo means operating the valve completely eliminates hunting at all degrees and directions of loading.

It is the general object of this invention to avoid and overcome the foregoing and other objections to and difficulties of the prior art practices by the provision of a servo system which is highly stable under all conditions of both positive and negative loading.

Another object of this invention is the provision of an hydraulic servomechanism for stabilizing a search radar antenna, universally mounted on a ship or other craft, from a gyro-vertical.

Another object of this invention is to provide an improved hydraulic power control system using a pressure-regulated variable delivery pump and linear control valve, the pressure drop across the valve at any given orifice setting being held substantially constant under varying load conditions of the output of an hydraulic power control system.

Another object of this invention is the provision of an hydraulic power control in which the pressure on the input side of the linear control valve is regulated in response to pressure variations on the output side of the valve to compensate for fluctuating loads.

Another object of this invention is to provide an hydraulic power control servo system for stabilizing a universally mounted base from a gyro-vertical, the servo system having a main servo loop responsive to deviation errors between the base and the gyro-vertical, and having a second servo loop, which has a shorter time constant than the main servo loop, responsive to pressure variations in the hydraulic power control with large and sudden changes in loading conditions on the base.

These and other objects of the invention which will become apparent as the description proceeds are achieved by providing in a system for stabilizing a universally mounted base from a gyro-vertical, hydraulically operated power rams linked to the base for effecting movement about the mutually perpendicular roll and pitch axes thereof. Each ram associated with movement about its axis is positioned by means of a linear control valve supplied with oil from a pressure-regulated variable delivery pump. The valve is stroked by a servomotor controlled in response to an error signal derived from the relative position and movement of the base and gyro-vertical about the respective axis to maintain coincidence therebetween.

The output pressure of the variable delivery pump is controlled by a pressure regulator, a pressure-adjusting ram being linked to the pressure regulator and hydraulically connected in parallel across the power ram to vary the pressure setting of the regulator in response to variations in loading and speed of movement of the platform. A solenoid-operated reversing valve is inserted between the pressure-adjusting ram and the power ram. Means responsive to the direction of movement of the gyro-vertical actuates the reversing valve in accordance with the direction of movement of the ship about the respective axis. If the differential pressure across the power ram varies, the position of the pressure-adjusting ram changes to adjust the output pressure of the pump, the reversing valve providing a sensing of the direction in which the pressure should be changed to compensate for positive or negative loads.

For a better understanding of the invention, reference should be had to the accompanying drawing, wherein:

Fig. 1 is a schematic representation of an installation embodying the present invention, the servo system for stabilizing the antenna base about one axis being shown; and Fig. 2 is a graphical representation of the transfer characteristic of an hydraulic valve of the type used in the servo system of Fig. 1 under varying load conditions with constant pressure input.

With specific reference to the form of the invention as illustrated in the drawing, the numeral 10 indicates generally a base, hereinafter referred to as a stable base, which is universally mounted by means of a gimbal ring 12 to provide movement of the stable base about two mutually perpendicular axes, namely, the pitch axis 14 and the roll axis 16. The stable base is rotatably supported about the pitch axis from the gimbal ring 12 by means of trunnions 18 which are pivotally secured to the gimbal ring along the pitch axis 14. The gimbal ring in turn is pivotally supported for rotation of the stable base about the roll axis 16 by means of trunnions 20 which are journalled in a frame, indicated generally at 22, the frame 22 constituting a portion of a ship's structure.

Mounted on top of the stable base 10 may be a rotating search radar antenna 23. While the particular load supported by the stable base 10 forms no essential part of the present invention, a radar antenna is illustrated because it imposes unusual loading conditions on the servo system, which conditions the servo system of the present invention is particularly adapted to meet.

The load conditions imposed on the output of the usual servomechanism consist principally of friction, which opposes the motion of the controlled member. However, in the case of the radar antenna illustrated, an additional load of considerable magnitude is imposed by windage resulting from the relatively large surface area of the antenna.

Not only do the wind loads encountered impose unusual loading conditions, but the radar antenna mounted on the stable base places the center of gravity of the entire stabilized mass well above the gimbal support. Coupling this with the fact that the antenna is usually placed at one of the highest points on the ship's superstructure, it will be appreciated that the torques required to maintain the antenna vertical may become quite large when the antenna experiences the high linear acceleration resulting from masthead motion. Both the wind torques and linear acceleration torques may exceed the torque required to accelerate the base against inertia and friction loads by a factor of from fifteen to twenty times. Moreover, both may individually impose either positive or negative loads. Thus, a range of loading from large negative to large positive loads may be encountered in the operation of the stable base servo system with a radar antenna as illustrated.

Movement of the stable base 10 about the pitch axis 14 is effected by means of an hydraulic motor, indicated at 24, which is preferably of a double-acting ram type having cylinder 25 pivotally mounted on the gimbal ring 12. The piston rod 26 in turn is pivotally connected to the stable base 10 at a point above the axis 14, whereby fluid under pressure admitted to either side of the piston 28 tilts the stable base 10 about the pitch axis 14.

Movement of the stable base 10 about the roll axis is similarly effected by means of a power ram 29, the cylinder of which is pivotally mounted on the ship's frame 22 and the piston rod of which is pivotally secured to a lever arm 30 integral with the gimbal ring 12. Movement of the lever arm 30 tilts the gimbal ring 12 about the roll axis 16. Since the hydraulic power controls and servo systems for controlling movement of the stable base 10 relative to the roll and pitch axes respectively are substantially identical, only the servo system controlling movement about the pitch axis 14 has been illustrated and will be described.

The hydraulic power control for controlling movement of the stable base about the pitch axis includes a variable delivery piston-type pump, indicated generally at 31. A suitable pump for the purpose is the Vickers AA-20200 series type positive displacement pump. Fluid under pressure is delivered by the pump 31 through a fluid line 32 to a four-way main control valve, indicated generally at 33. Lateral movement of the spool 34 within the cylindrical housing 35 permits fluid from line 32 to pass to either of two fluid lines 36 and 37 which direct flow of the fluid to opposite sides of the piston 28 in the ram 24. At the same time, the valve connects fluid from the other of the fluid lines 36 and 37 to the fluid return line 38, which returns the fluid to the pump 31.

The valve 33 is a conventional four-way valve, such as described in Patent No. 2,526,709, having a linear transfer characteristic, that is, under a constant load condition the rate of flow of fluid through the valve is proportional to the position of the valve. The valve is opened or closed by means hereinafter described to admit fluid to the ram 24 for positioning the stable base 10 as required.

As a reference for the stable base 10, a gyro-vertical is provided and mounted preferably near the metacenter of the ship. The gyro-vertical, indicated generally at 39, is universally mounted for movement about the pitch axis 40 and roll axis 41 by means of a gimbal ring 42 in the same manner as the stable base 10.

To obtain an error indication between the instantaneous position of the stable base 10 relative to the gyro-vertical 39, a pair of synchro generators 43 and 44 are linked to the gyro-vertical for movement relative to the pitch axis. A suitable train of anti-backlash spur gears provides a 2:1 ratio of rotation of the synchro generator 43 and a 36:1 ratio of rotation of the synchro generator 44 relative to the apparent rotation of the gyro-vertical 39 about the pitch axis.

Similarly, a pair of synchro control transformers 45 and 46 are linked by a suitable train of spur gears to the stable base 10 along the pitch axis 14, the spur gear train effecting a 2:1 rotation of the control transformer 45 and a 36:1 rotation of the control transformer 46. The output signals from the synchros are fed to a selective control circuit 47 and then combined in a summing amplifier 48 to provide a coarse and fine indication of the relative angular position of the gyro-vertical 39 and the stable base 10. Such coarse and fine synchro systems are well-known in the art (see Patent No. 2,455,364) and will not be further described here except to point out that the coarse and fine error signals are selected and combined by the selector circuit 47 and summing amplifier 48 in a manner which gives control at small errors (up to 1°) to the control transformer 46, and transfers control to the control transformer 45 for large errors. The transition is smooth with no abrupt discontinuities in either signal.

The summing amplifier 48 is of conventional design and includes a high gain amplifier 49 with inverse feedback through a resistor 50. A plurality of input signals are coupled to the amplifier 49 through series input resistors 51. The summing amplifier has five input channels, two of which are the coarse and fine signals from the selector circuit 47. Potentiometers may be provided for each of the input channels to permit adjustment of the amplitude of each of the input signals to the summing amplifier.

The output of the summing amplifier 48 is coupled through a power amplifier 52 to one phase of a two-phase servomotor, hereinafter referred to as the stroke motor 53. Any error signals developed at the output of the synchro transformers 45 and 46 as the result of an angular deviation between the orientation of the gyro-vertical 39 relative to the stable base 10 effect rotation of the stroke motor 53. The stroke motor 53 in turn rotates gears 54 which operate a splined screw feed 55 coupled to the main valve spool 34, rotation of the motor thus providing the motive means for stroking the valve. Any system error (the instantaneous angular error between the gyro-vertical and the stable base about the pitch axis) indicated by the synchros actuates the valve to initiate a correction in the relative position of the stable base 10 to immediately reduce the system error to zero.

To provide a damping factor in the servo system, an A.-C. tachometer 56 is driven by the stroke motor to generate a valve stroke velocity signal proportional to the rate of movement of the valve spool 34. The output signal of the tachometer 56 is fed to the summing amplifier 48 in a manner as to oppose the system error signal derived from the synchro transformers 45 and 46. The result is a stroke motor shaft rotation having an angular velocity proportional to the angular displacement between the gyro-vertical 39 and the stable base 10. Since the valve 33 has a linear transfer characteristic, constant velocity of movement of the control valve results in constant acceleration of the stable base 10. Thus, with no additional signals applied to the summing amplifier 48, the instantaneous acceleration of the stable base 10 is made proportional to the angular deviation between the gyro-vertical 39 and the stable base 10.

The servo system as so far described can be made stable by making the feedback (the stroke valve velocity signal from the tachometer 56) very large, but this produces large acceleration errors as a result of the large valve stroke velocity signal. To reduce these excessive acceleration errors, a derivative of the system error, that is, an error rate signal, is obtained and fed to the summing amplifier 48. The additional stabilization effect of the derivative signal reduces the amount of feedback from the tachometer 56 required, so that the acceleration error is reduced.

To this end, a differential synchro generator 57 is geared to the pitch axis of the stable base 10 at a 36:1 speed ratio. The differential synchro generator receives gyro-vertical data from the synchro generator 44 so that its output is a measure of the system error. An error rate servo system indicated generally at 58, includes a synchro control transformer 59 which receives the output from the differential synchro generator 57. The output signal from the control transformer 59 is amplified by suitable amplifying means, indicated at 60, and applied to a servo motor 61, the shaft of which is coupled to the rotor shaft of the synchro transformer 59. The motor 61 is rotated to reduce the output of the synchro transformer 59 to zero.

Stability of the error rate servo system 58 is provided by feedback of a signal derived from a tachometer 62 and fed to the input of the amplifier 60. The feedback signal is adjusted for critical damping of the error rate servo. Thus, the rate of rotation of the motor 61 and synchro transformer 59 is made proportional to the difference between the rate of rotation of the synchro generator 44 and the differential synchro generator 57. An A.-C. tachometer 63 rotated by the servo motor 61 generates an output signal proportional to the rate of change of the system error.

This error rate signal from the A.-C. tachometer 63 is fed to the summing amplifier 48. The error rate signal anticipates the reduction of the system error to zero and reverses the direction of the stroke motor to return the spool 34 of the valve 33 to its neutral position when the system error is zero. The error rate signal assumes much of the stabilizing responsibility for the main system and thereby permits a reduction in the stroke servo motor velocity signal previously described. During the synchronizing operation, when the system error and error rates are large, the error rate servo 58 turns rapidly and generates a high level error rate signal to assure the smoother synchronizing of the main power control system.

The servo system described thus far has excellent stability characteristics. However, there are present in the system acceleration errors at constant load plus load rate errors at constant speed. Further reduction of these errors can be effected by introducing a signal from outside the servo loop which exactly cancels the error generated within the loop. This can be accomplished by providing a D.-C. tachometer 64 driven by the pitch axis movement of the gyro-vertical, as by coupling it onto the shaft of the synchro generator 44. The output signal from the tachometer 64, when differentiated by a suitable RC differentiating circuit, indicated at 66, provides an error signal substantially proportional to gyro-vertical acceleration. The resulting gyro-vertical acceleration signal is then modulated by means of a balanced phase-sensitive modulator 67 and supplied to the summing amplifier 48. The level of this signal is adjusted so that under normal operating conditions the signal obtained from the gyro-vertical acceleration function cancels the stable base acceleration error signal generated within the main servo loop.

The servo system, including the hydraulic power control as above described, gives excellent performance where the torque load on the stable base are not too large. Damping, frequency response, and stability are acceptable, with the system error being easily held within the limit of a ten minute angle where the only loads are those encountered without any wind acting on the antenna. However, as was pointed out above, the wind load on the radar antenna represents a major load factor and may at any instant aid or oppose the motion of the stable base 10. It has been found that large positive or negative loads, as are encountered under certain conditions of wind, roll, and pitch, result in instability with attendant high frequency hunting under large negative loads and low frequency hunting under large positive loads.

The reason for this instability can be appreciated by considering the transfer characteristics of the main valve 33 under varying load conditions. Fig. 2 shows a graphical plot of fluid flow as a function of valve opening with negative, no-load, and positive loads, assuming substantially constant pressure on the input side of the valve. It will be evident from Fig. 2 that with positive loading, the valve must be opened wider to maintain a given rate of flow through the valve, while with negative loading, the valve must be closed down to maintain the same rate of flow through the valve. This means that to achieve the same acceleration of the stable base for both positive and negative loads, the valve stroking speed must be different for each condition, and hence the stroke valve velocity signal which stabilizes the servo system can be off calibration by a large factor. When the stroke velocity stabilizing function deviates from the optimum value by a factor of ±20%, instability and hunting result. Actually, under certain load conditions the stroke velocity stabilizing function may greatly exceed this tolerance limit.

A significant feature of the present invention is the provision of a modification in the hydraulic control which overcomes this instability resulting from the large variations in loading on the stable base. Instability can be overcome by adjusting the delivery pressure of the pump so as to maintain the rate of flow through the valve 33 for a given valve opening substantially constant regardless of the magnitude and direction of the load on the power rams. By adjusting the delivery pressure, the valve stroke velocity can be maintained constant for a given stable base acceleration, so that the stroke velocity stabilizing function in the servo system is not affected by changes in load.

Referring again to Fig. 1 of the drawing, the pump 31 is of a well-known type having a tiltable pumping unit 68 and drive unit including an electric motor 69. The pumping unit is fully enclosed within a housing 70 which serves as a sump for the return fluid. The volume of delivery is determined by the relative inclination of the pumping unit 68 to the drive unit 69 of the pump. When the pumping unit is tilted to the extreme left, as shown in Fig. 1, the pump is set for maximum delivery. Tilting of the pumping unit 68 to the right decreases the delivery volume proportionately until zero volume is reached when the axes of the pumping and drive units are in alignment.

Means is provided for automatically varying the volume of the pump with demand to regulate the delivery pressure to some predetermined value. Such means includes an hydraulic pump control ram 71 secured to the side of the housing 70. The ram 71 includes a cylinder 72, one end of which communicates with the output line 32 through a pilot valve 73 by means of fluid lines 74 and 75. A piston 76 has a piston rod 77 connected thereto which extends into the housing 70 and is coupled by a link 78 to the pumping unit 68. Fluid under pressure moves the piston 76 to the right against the action of a spring 79 which urges the piston 76 to the left. Thus, increased fluid pressure to the ram 71 moves the pumping unit to the right and decreases the volume of delivery, while decreased fluid pressure permits the spring 79 to tilt the pumping unit 68 to the left, and thus increases the volume of delivery.

The pilot valve 73 includes a valve spool 80 which slides in the cylinder 81. Fluid under pressure from the line 74 moves the valve spool 80 to the right against the action of a spring 82. If the pressure is sufficient, the pilot valve 73 is opened to admit fluid through the line 75 into the ram 71 where the fluid acts to move the piston 76 to the right to reduce the volume of delivery of the pump 31. With decreased volume, the delivery pressure drops, the spring 82 moves the spool 80 to the left, permitting fluid in the ram 71 to bleed off through the line 83 back to the fluid return side of the pump 31.

The whole action above described amounts to a matter of automatically and continuously balancing fluid pressures against spring resistances in order to position the pumping unit 68 to deliver the required volume of fluid at all times in response to pressure control. It will be readily seen that any change in the spring pressure of the spring 82 in the pilot valve 73 results in a corresponding change in the stabilized delivery pressure of the pump 31. In the pump as available commercially, the spring pressure is set by a screw driver adjustment to obtain a predetermined constant pressure output from the pump, regardless of volume demand.

In order to vary automatically the delivery pressure of the pump so as to maintain the rate of flow through the valve 33 for a given valve opening substantially constant regardless of the magnitude and direction of the load on the ram 24, a pressure-adjusting ram 84 is provided for varying the compression of the spring 82. The pressure-adjusting ram 84 includes a piston 85 within a cylinder 86. A piston rod 87, connected to the piston 85, is terminated in a plunger 88 within the cylinder 81 of the pilot valve 73. The plunger 88 serves as a seat for the spring 82 and thus movement of the plunger 88 to the right or left acts to decrease or increase the pressure of the spring 82 against the valve spool 80. The piston 82 is centered by means of a pair of compression springs 89 and 90 on either side of the piston within the cylinder 86. The springs 89 and 90 are made quite stiff relative to the spring 82.

The piston 85 of the pressure-adjusting ram 84 is displaced to the right or left to vary the delivery pressure of the pump in response to variations in pressure across the power ram 24 with changes in load on the stable base 10. This is accomplished by hydraulically connecting the pressure-adjusting ram 84 in parallel across the power ram 24 through a solenoid-actuated four-way reversing valve 91. Fluid lines 92 and 93 connect opposite ends of the cylinder 86 to the reversing valve 91. Fluid lines 94 and 95 in turn connect the reversing valve 91 across opposite ends of the cylinder 25 of the power ram 24. Positioning of the valve spool 96, either to the right or left, permits passage of fluid through fluid pipe 94 to either side of the piston 85, the other side of the piston 85 communicating with the fluid pipe 95.

In the absence of any fluid pressure differential across the ram 24, the springs 89 and 90 maintain the piston 85 in a neutral position, which in turn maintains the output pressure of the pump at a predetermined average level, for example, approximately 1000 pounds per square inch. Any load imposed on the ram 24 results in a pressure differential existing between opposite sides of the piston 85 of ram 84, which in turn increases or decreases the compression of the spring 82, depending on the direction of the load on the power ram 24, and modifies the delivery pressure of the pump 31 accordingly. At no-load on the power ram 24, the delivery pressure is held at the average pressure. A change in load on the ram 24 changes the output pressure of the pump 31 proportionately.

As has been pointed out above, the load on the stable base 10 may either aid or oppose the motion of the power ram 24. Depending on whether the load is aiding or opposing the motion of the ram 24, the delivery pressure of the pump 31 must be either decreased or increased to maintain the flow of fluid through the valve 33 substantially constant for a given valve opening. Thus, some sensing means is required to determine the relation between the direction of movement of the pitch of the ship relative to the load imposed on the ram 24.

To this end the signal from the tachometer 64 is used to control the solenoid-operated reversing valve 91, since the tachometer gives a continuous indication of the pitch direction of the ship. The output signal from the tachometer 64 is applied to a differential relay 102 through a magnetic amplifier 99. Depending on the polarity of the applied signal, the relay 102 connects one or the other of the solenoids 97 and 98 to a source of potential 104. A change in polarity of the signal from the tachometer, which occurs with change in direction of rotation, reverses the position of the valve spool 96, either to the right or the left. Springs 100 tend to maintain the valve spool in the center position illustrated. The gain of the amplifier 99 is such that the valve 91 is reversed substantially instantaneously with a reversal in direction of pitch of the ship, and the valve spool is maintained in one extreme position or the other with the slightest pitching movement of the ship.

If the pitch of the ship at a given instant is such that the piston 28 is moving to the left, as viewed in Fig. 1, to maintain the antenna vertical, the pressure in line 95 would be slightly higher than in line 94. If the wind at the same instant is blowing so as to oppose the movement of the ram 24, the pressure in line 95 would increase. To maintain flow of fluid through the main valve 33, the delivery pressure of the pump must be increased. When the pitch of the ship is such as to require movement of the piston 28 to the left, the valve spool 96 of the reversing valve 91 is biased to the left by the signal from the tachometer 64 actuating the solenoids 97 and 98. The increased pressure in line 95 is thus applied through line 93 to the ram 84. The plunger 88 is moved to the left causing an increase in the delivery pressure of the pump 31 in the manner above described.

With the pitch of the ship in the same direction as above assumed, but the direction of the wind reversed, the pressure in line 95 is reduced. If the wind load exceeds any torques which oppose movement of the piston 28 to the left, the pressure in line 94 will exceed that in line 95. This, in turn, results in movement of the piston 85 to the right with an attendant decrease in the delivery pressure of the pump 31. Since the pitch of the ship is in the same direction, no change in the position of the valve spool 96 occurs. Thus, with the pitch of the ship at any instant being the same, the delivery pressure of the pump is increased or decreased accordingly as the load on the antenna opposes or aids the motion of the power rams in maintaining the antenna vertical.

From the above description it will be recognized that the various objects of the invention have been achieved by the provision of an improved servo system for stabilizing a radar antenna base from a gyro-vertical. The modified hydraulic power control, in which the delivery pressure is increased or decreased from a center operating pressure at no-load, gives stability to the system over the large range of both positive and negative loads peculiar to the stabilizing of a radar antenna which is top-heavy and bulky.

While the hydraulic power control has been particularly described as part of a stable base servo system, it should be noted that the hydraulic control may be employed in other ways, as in applications where constant speed under greatly varying conditions of load is required with a given main control valve setting. Since many other changes could be made in the above construction and many widely different embodiments of this invention could be made without departing from the scope thereof, it is intended that all matter contained in the above description or shown in the accompanying drawings shall be interpreted as illustrative and not in a limiting sense.

What is claimed is:

1. A servo system for stabilizing a controlled member from a controlling member comprising hydraulic motor means associated with the controlled member for imparting movement thereto, an hydraulic pump, a valve hydraulically coupling the pump to the motor, stroke motor means associated with the valve for stroking the valve to adjust the direction and rate of flow of fluid to the motor, first signal generating means responsive to the relative position and movement of the controlling and controlled members, the output signal from the first generating means being coupled to the stroke motor means to effect movement of the valve in response to the error signal, means including a regulating spring for regulating the fluid delivery pressure of the pump, the fluid pressure being regulated by balancing against the spring pressure, a spring-centered hydraulic ram mechanically linked to said pressure regulating means for adjusting the spring pressure of the regulating spring, linear displacement of the ram being proportional to the pressure across the ram, a solenoid-actuated reversing valve hydraulically coupling the ram in parallel across the hydraulic motor, and second signal generating means responsive to movement of the controlling member, the second signal generating means being electrically coupled to the solenoid-actuated reversing valve for actuating the valve with change in direction of motion of the controlling member.

2. In combination, a controlling member, a controlled member, hydraulic motor means associated with the controlled member for imparting movement thereto, an hydraulic pump, means for varying the rate and direction of flow of fluid from the pump to the motor in response to errors in the relative position and movement of the controlling and controlled members, means including a regulating spring for regulating the fluid delivery pressure of the pump, the fluid pressure being regulated by balancing against the spring pressure, a spring-centered hydraulic ram mechanically linked to said pressure regulating means for adjusting the spring pressure of the regulating spring, linear displacement of the ram being proportional to the pressure across the ram, a solenoid-actuated reversing valve hydraulically coupling the ram in parallel across the hydraulic motor, and signal generating means responsive to movement of the controlling member, the signal generating means being electrically coupled to the solenoid-actuated reversing valve for actuating the valve with change in direction of motion of the controlling member.

3. A servo system for stabilizing a controlled member from a controlling member comprising hydraulic motor means associated with the controlled member for imparting movement thereto, an hydraulic pump, means for varying the rate and direction of flow of fluid from the pump to the motor in response to errors in the relative position and movement of the controlling and controlled member, means for regulating the fluid delivery pressure of the pump, a spring-centered hydraulic ram mechanically linked to said pressure regulating means for adjusting the pump delivery pressure, a solenoid-actuated reversing valve hydraulically coupling the ram in parallel across the hydraulic motor, and signal generating means responsive to movement of the controlling member, the signal generating means being electrically coupled to the solenoid-actuated reversing valve for actuating the valve with change in direction of motion of the controlling member.

4. A servo system for synchronizing movement between a controlling member and a controlled member, said system comprising hydraulic motor means associated with the controlled member for imparting movement thereto, an hydraulic pump, means for varying the rate and direction of flow of fluid from the pump to the motor in response to errors in the relative position and movement of the controlling and controlled member, adjustable means for regulating the fluid delivery pressure of the pump, hydraulically actuated means mechanically linked to said pressure regulating means for adjusting the pump delivery pressure, reversing valve means hydraulically coupling said pressure-adjusting means in parallel across the hydraulic motor, and means responsive to movement of the controlling member for actuating the reversing valve means with change in direction of motion of the controlling member.

5. An electro-hydraulic servo system for stabilizing a universally mounted base from a universally mounted gyro-vertical, said system comprising at least one hydraulic ram linked to the base for tilting the base about an axis, a variable delivery pump, a main control valve hydraulically connected between the pump and the ram for controlling movement of the ram, servo means for controlling the main valve in response to the relative position and movement of the gyro-vertical and the base about said axis, pressure control means operatively associated with the pump for regulating the delivery pressure of the pump with changes in fluid demand, a spring-centered hydraulic ram connected to the pressure regulating means for adjusting the pressure regulating means to control the delivery pressure of the pump, a reversing valve hydraulically coupling the base positioning ram and the pressure-adjusting ram in parallel, and solenoid means operatively associated with the reversing valve for reversing the effective pressure across the pressure-adjusting ram relative to the effective pressure across the platform-positioning ram, the solenoid means being actuated by said main valve controlling means in response to the instantaneous direction of movement of the gyro-vertical.

6. An electro-hydraulic servo system for stabilizing a universally mounted base from a universally mounted gyro-vertical, said system comprising at least one hydraulic ram linked to the base for tilting the base about an axis, a variable delivery pump, a main control valve hydraulically connected between the pump and the ram for controlling movement of the ram, servo means for controlling the main valve in response to the relative position and movement of the gyro-vertical and the base about said axis, means operatively associated with the pump for regulating the delivery pressure of the pump with changes in fluid demand, means connected to the pressure regulating means for adjusting the pressure regulating means to control the delivery pressure of the pump, a reversing valve hydraulically coupling the base positioning ram and the pressure-adjusting means in parallel, and means operatively associated with the reversing valve for actuating the valve to reverse the direction of operation of the adjusting means relative to the effective pressure across the platform-positioning ram, said last-named means being actuated by said main valve controlling means in response to the instantaneous direction of movement of the gyro-vertical.

7. In combination, a variable delivery hydraulic pump, a main hydraulic ram, a linear reversing valve hydraulically coupling the pump and the main ram for controlling the direction and rate of flow of fluid from the pump to the main ram, means associated with the pump for varying the rate of delivery of the pump, spring-loaded pressure regulating means hydraulically connecting the rate varying means to the output side of the pump, the pressure regulating means being adapted to control the rate varying means in response to the output pressure of the pump to maintain the pressure substantially constant with changes in delivery rate, a pressure-adjusting ram associated with the pressure regulating means, the pressure-adjusting ram being hydraulically connected across the main ram and being spring-centered whereby the pressure-adjusting ram is displaced from center in proportion to the pressure drop across the main ram, and a reversing valve hydraulically connected between the main ram and the pressure-adjusting ram for reversing the direction of displacement of the adjusting ram in dependence upon the direction of displacement of the main ram.

8. In combination, an hydraulic pump, an hydraulic motor, means for controlling the direction and rate of flow of fluid from the pump to the motor, hydraulically operated means associated with the pump for varying the output pressure and rate of delivery of the pump, spring-loaded pressure regulating means hydraulically connecting the pressure and rate varying means to the output side of the pump, the pressure regulating means being adapted to control the pressure and rate varying means in response to the output pressure of the pump to maintain the pressure substantially constant with changes in delivery rate, and an adjusting ram associated with the pressure regulating means for adjusting the delivery pressure of the pump, the adjusting ram being hydraulically connected across said hydraulic motor and spring-centered to be displaced from center in proportion to the pressure drop across said hydraulic motor.

9. In combination, an hydraulic pump, a motor hydraulically connected to the pump, variable flow fluid transfer valve means having intake and outlet sides respectively connected to said pump and said motor for proportionally varying the direction and rate of flow of fluid to the motor in accordance with the direction and magnitude of the opening of said valve, adjustable means hydraulically connected across the intake side of said valve means for regulating the pressure on said intake side thereof at some selected level regardless of the rate of flow of fluid through the valve means, and means hydraulically connected across the output side of said valve means and responsive to changes in the pressure drop across the motor for adjusting said pressure regulating means to vary the pressure at the intake side of said valve means in response to variations in the pressure drop across the motor.

10. A servo system for synchronizing movement between a controlling member and a controlled member, said system comprising an hydraulic motor associated with the controlled member, an hydraulic pump, servo-operated valve means for controlling the direction and rate of flow of fluid to the motor in response to any error in the relative positions of the controlled and controlling members, adjustable means for regulating the pressure on the intake side of the valve means at some selected level regardless of the rate of fluid flow through valve means, a spring-centered adjusting ram connected hydraulically in parallel with the motor whereby the displacement of the adjusting ram is substantially proportional to the pressure drop across the motor, the adjusting ram being linked to said pressure regulating means to vary the intake pressure at the valve means in response to variations in the pressure drop across the motor, a solenoid-operated reversing valve connected hydraulically between the motor and adjusting ram, and a tachometer drived by movement of the controlling member for actuating the solenoid-operated reversing valve.

11. A servo system comprising a controlling member, a controlled member, an hydraulic motor associated with the controlled member, an hydraulic pump, servo-operated valve means for controlling the direction and rate of flow of fluid to the motor in response to any error in the relative positions of the controlled and controlling members, adjustable means for regulating the pressure on the intake side of the valve means at some selected level regardless of the rate of fluid flow through valve means, a spring-centered adjusting ram connected hydraulically in parallel with the motor whereby the displacement of the adjusting ram is substantially proportional to the pressure drop across the motor, the adjusting ram being linked to said pressure regulating means to vary the intake pressure at the valve means in response to variations in the pressure drop across the motor, reversing valve means connected hydraulically between the motor and adjusting ram, and means responsive to the direction of movement of the controlling member for reversing the valve means with reversal of direction of movement of the controlling member.

12. A servo system for synchronizing movement between a controlling member and a controlled member, said system comprising an hydraulic motor associated with the controlled member, an hydraulic pump, servo-operated valve means for controlling the direction and rate of flow of fluid to the motor in response to any error in the relative position and movement of the controlled and controlling members, adjustable means for regulating the pressure on the intake side of the valve means at some selected level regardless of the rate of fluid flow through valve means, means responsive to changes in the pressure drop across the motor for adjusting said pressure regulating means to vary the intake pressure at the valve means in response to variations in the pressure drop across the motor, reversing valve means connected hydraulically between the motor and said pressure-adjusting means, and means responsive to the direction of movement of the controlling member for reversing the valve means with reversal of direction of movement of the controlling member.

13. A servo system comprising a controlling member, a controlled member, an hydraulic motor associated with the controlled member, an hydraulic pump, servo-operated valve means for controlling the direction and rate of flow of fluid to the motor in response to any error in the relative positions of the controlled and controlling members, adjustable means for regulating the pressure on the intake side of the valve means at some selected level regardless of the rate of fluid flow through valve means, and means responsive to changes in the pressure drop across the motor for adjusting said pressure regulating means to vary the intake pressure at the valve means in response to variations in the pressure drop across the motor.

14. A servo system for synchronizing movement between a controlling member and a controlled member, said system comprising an hydraulic motor associated with the controlled member, an hydraulic pump, servo-operated valve means for controlling the direction and rate of flow of fluid to the motor in response to any error in the relative positions of the controlled and controlling members, adjustable means for regulating the pressure on the intake side of the valve means at some selected level regardless of the rate of fluid flow through the valve means, and means responsive to changes in the pressure drop across the motor for adjusting said pressure regulating means to vary the intake pressure at the valve means in response to variations in the pressure drop across the motor.

15. In a positional servo system, means producing an error signal in accordance with the difference in the position and movement of a controlled member relative to the position of movement of a controlling member, said controlled member being subject to variable external loads and said controlling member being unaffected by said loads, a source of energy, motor means for actuating said controlled member from energy derived from said source, means responsive to said error signal for controlling the energy supplied by said source to said motor means in a direction and an amount to reduce said error signal toward zero, and means responsive to variations in said external loads for controlling the energy output of said source whereby to eliminate the effects of said external loads on the position and movement of said controlled member in response to the position and movement of said controlling member.

16. In combination, an hydraulic pump, a motor hydraulically connected to the pump, settable valve means having inlet and outlet sides hydraulically connected respectively to said pump and to said motor for controlling the rate of flow of fluid from said pump to said motor for any given setting thereof, adjustable means for maintaining the pressure output of said pump at any selected level, means connected between said inlet side and said pump and responsive to the pressure at the inlet side of said valve means, means connected between said outlet side and said motor and responsive to the pressure at the outlet side of said valve means, and means responsive to said last two mentioned means for adjusting said pressure regulating means in accordance with the difference between said inlet and outlet pressures whereby to maintain the pressure drop across said valve means substantially constant and thereby to maintain the rate of flow of fluid to said motor substantially constant for said given valve setting.

References Cited in the file of this patent

UNITED STATES PATENTS

| | | |
|---|---|---|
| 1,996,466 | Ernst | Apr. 2, 1935 |
| 2,333,530 | Ernst | Nov. 2, 1943 |
| 2,414,690 | Edwards | Jan. 21, 1947 |